(12) United States Patent
Ng et al.

(10) Patent No.: US 11,797,817 B2
(45) Date of Patent: Oct. 24, 2023

(54) SMART CARDS HAVING LED AND METHODS FOR FABRICATION THEREOF

(71) Applicant: SMARTFLEX TECHNOLOGY PTE LTD, Singapore (SG)

(72) Inventors: Eng Seng Ng, Singapore (SG); Sze Yong Pang, Singapore (SG); Gunenthiran Kailasam, Singapore (SG)

(73) Assignee: Smartflex Technology PTE LTD, Singapore (SG)

( * ) Notice: Subject to any disclaimer, the term of this patent is extended or adjusted under 35 U.S.C. 154(b) by 0 days.

(21) Appl. No.: 18/040,143

(22) PCT Filed: Jul. 12, 2021

(86) PCT No.: PCT/SG2021/050407
§ 371 (c)(1),
(2) Date: Jan. 31, 2023

(87) PCT Pub. No.: WO2022/031224
PCT Pub. Date: Feb. 10, 2022

(65) Prior Publication Data
US 2023/0289553 A1 Sep. 14, 2023

Related U.S. Application Data

(60) Provisional application No. 63/061,646, filed on Aug. 5, 2020.

(51) Int. Cl.
*G06K 19/06* (2006.01)
*G06K 19/077* (2006.01)

(52) U.S. Cl.
CPC . *G06K 19/07705* (2013.01); *G06K 19/07722* (2013.01); *G06K 19/07783* (2013.01)

(58) Field of Classification Search
CPC ............ G06Q 20/341; G06Q 20/3821; G06Q 20/352; G06K 19/07733; G06K 19/07749;
(Continued)

(56) References Cited

U.S. PATENT DOCUMENTS 7,156,301 B1 * 1/2007 Bonalle ................ G07F 7/0833
235/487
7,975,915 B2 7/2011 Fidalgo et al.
(Continued)

FOREIGN PATENT DOCUMENTS

CN 111066377 A 4/2020
JP 2006201826 8/2006
(Continued)

*Primary Examiner* — Daniel St Cyr
(74) *Attorney, Agent, or Firm* — Cuenot, Forsythe & Kim, LLC; Stanley A. Kim

(57) ABSTRACT

The present disclosure relates to a smart card device comprising: a laminated core comprising: a front substrate (10); a first flexible sheet (20) having a card circuitry formed thereon; a first substrate (30); a second flexible sheet (40) having an inductive circuitry formed thereon, and a second substrate (50) in a top-to-bottom order, wherein the front substrate (10) provides at least one first opening (11) which defines a perforated design and a second opening (12) through which a contact pad (22) is exposed, wherein the card circuitry includes: a flip chip (21), a first antenna coil (24) conductively coupled to the flip chip (21), the contact pad (22), at least one conductor path (23) conductively coupling the contact pad (22) to the flip chip (21), wherein the inductive circuitry includes at least one LED module (46) arranged proximate to the at least one first opening (11) and a second antenna coil (44) conductively coupled to the at least one LED module (46), and wherein the first substrate (30) includes at least one light guide (31) which is arranged under the at least one first opening (11) and configured to
(Continued)

direct an illumination produced by the at least one LED module (46) through the at least one first opening (11) to illuminate the perforated design.

28 Claims, 8 Drawing Sheets

(58) Field of Classification Search
CPC ....... G06K 19/07773; G06K 19/07705; G06K 19/045; G06K 19/06046; G06K 7/10732
USPC .................................................. 235/487, 492
See application file for complete search history.

(56) References Cited

U.S. PATENT DOCUMENTS

| | | |
|---|---|---|
| 9,697,459 B2 | 7/2017 | Finn et al. |
| 2005/0001711 A1* | 1/2005 | Doughty ................ G07C 9/257 |
| | | 340/5.82 |
| 2007/0220272 A1* | 9/2007 | Campisi ........... G06Q 20/40145 |
| | | 713/186 |
| 2015/0317553 A1 | 11/2015 | Pueschner et al. |
| 2017/0109620 A1* | 4/2017 | Wurmfeld ........ G06K 19/07722 |
| 2019/0272456 A1 | 9/2019 | Roach et al. |
| 2020/0160135 A1 | 5/2020 | Lowe |
| 2021/0019586 A1 | 1/2021 | Dreifus |

FOREIGN PATENT DOCUMENTS

| | | |
|---|---|---|
| JP | 2008519323 | 6/2008 |
| JP | 2019500749 | 1/2019 |
| TW | 201901512 A | 1/2019 |
| WO | 2011090230 | 7/2011 |
| WO | 2019038480 | 2/2019 |
| WO | 2019118505 | 6/2019 |

* cited by examiner

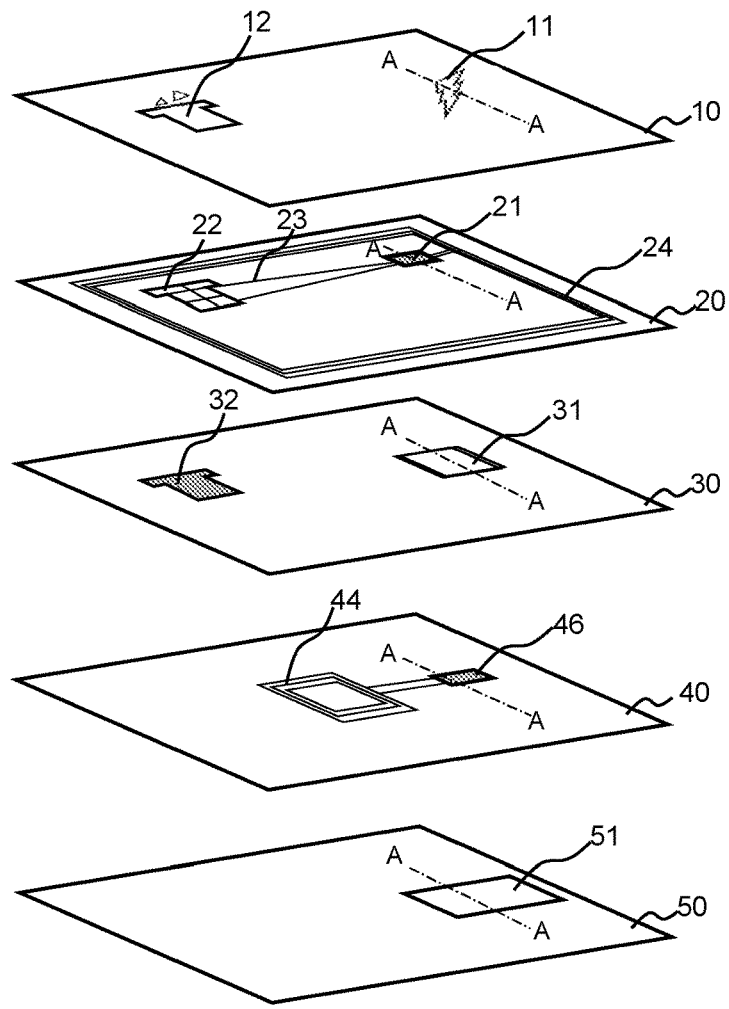
Figure 2A
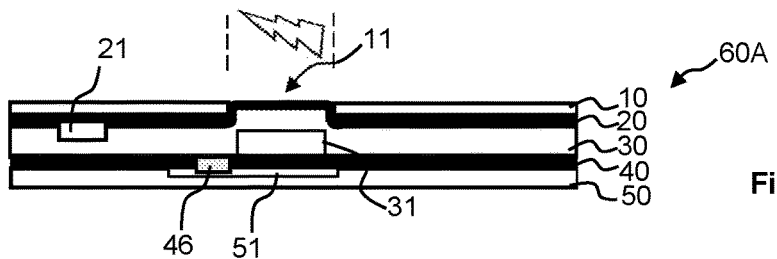
Figure 2B
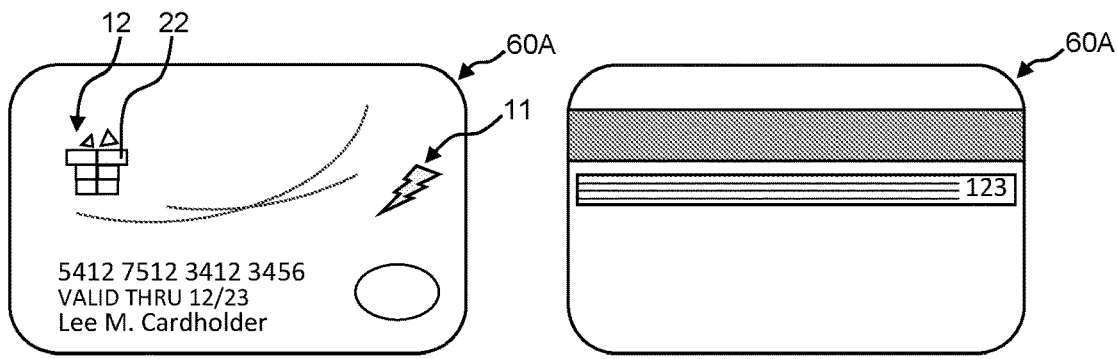
Figure 2C
Figure 2D

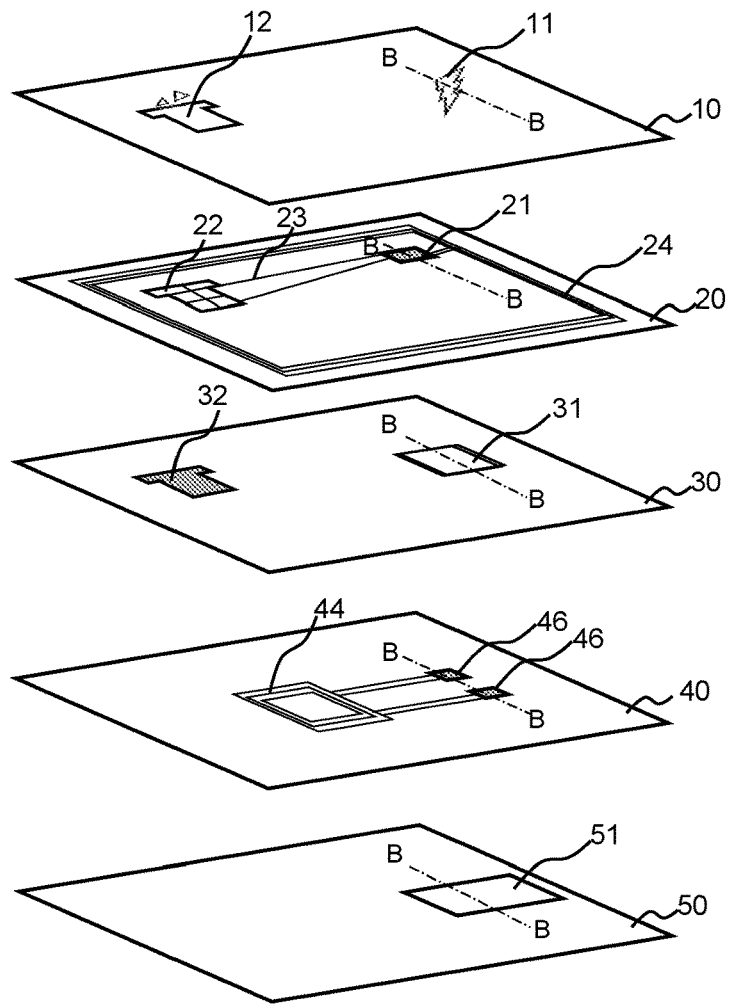
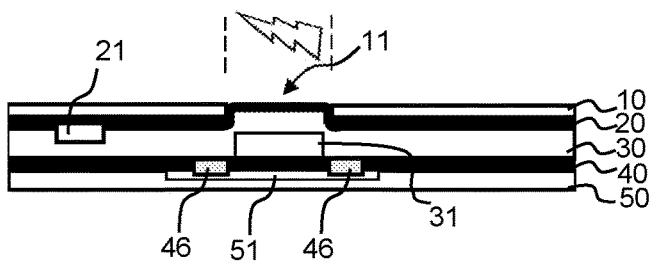
Figure 3A
Figure 3B
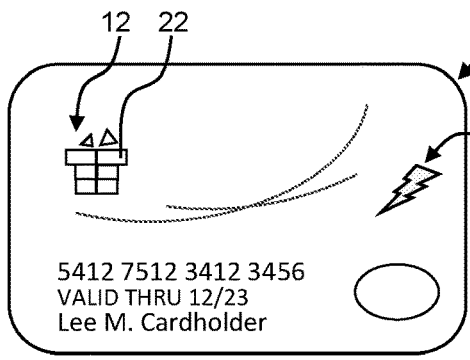
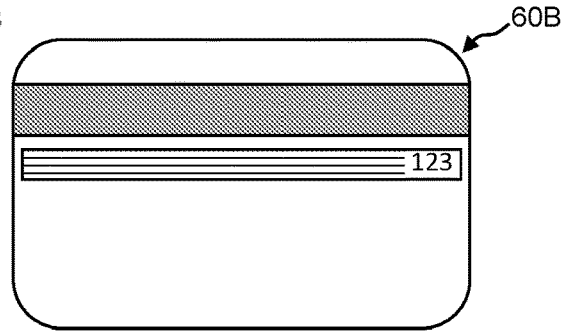
Figure 3C
Figure 3D

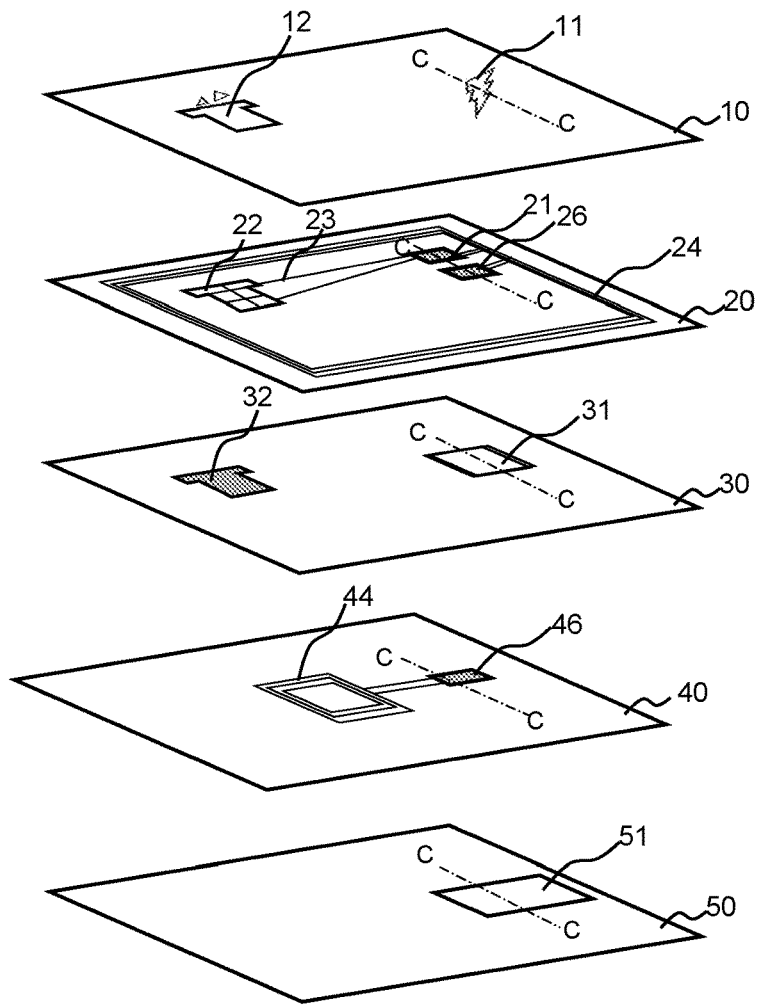
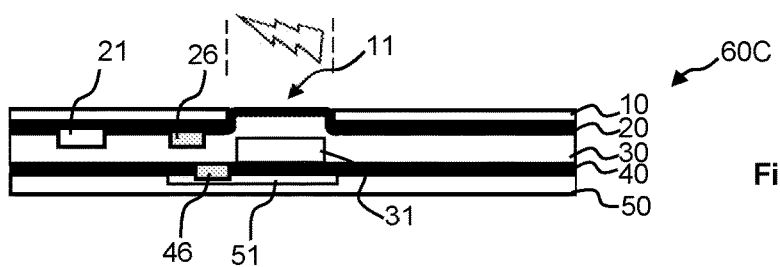
Figure 4A
Figure 4B
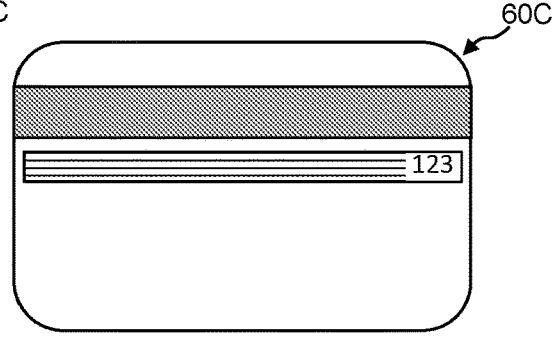
Figure 4C
Figure 4D

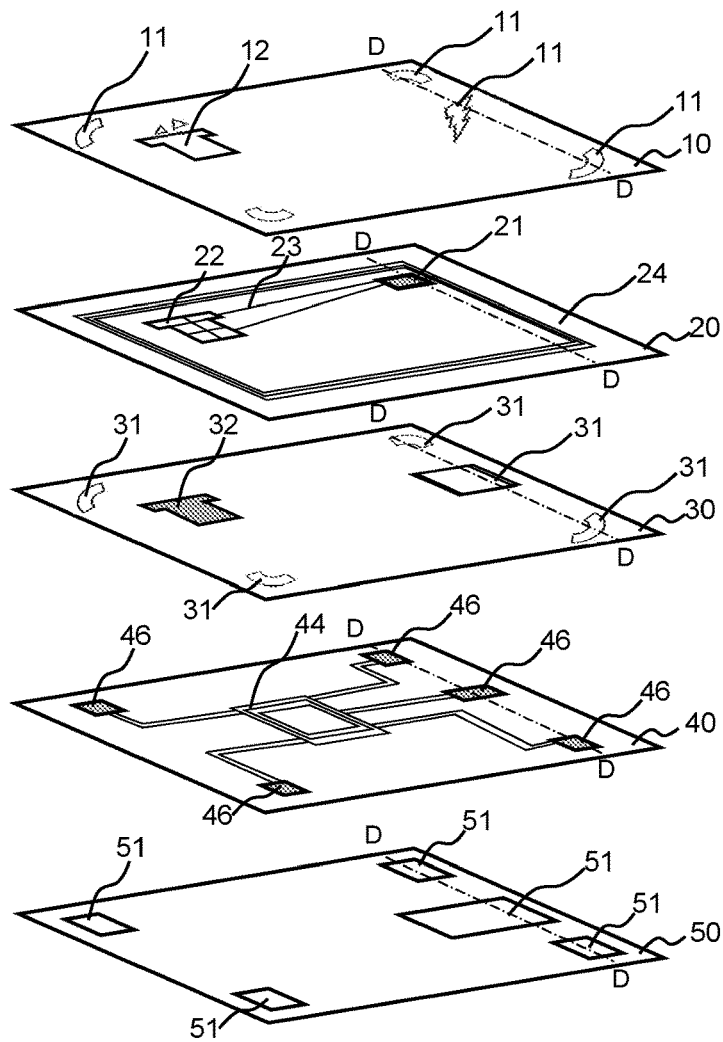
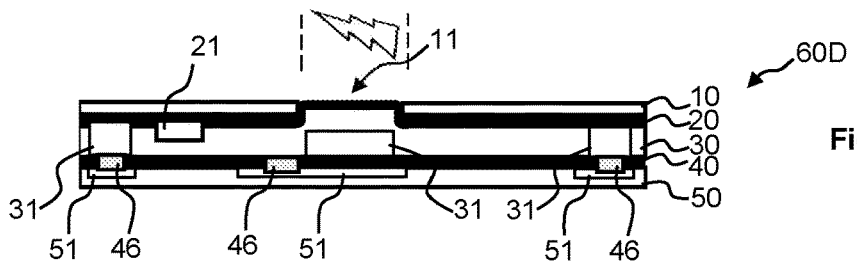
Figure 5A
Figure 5B
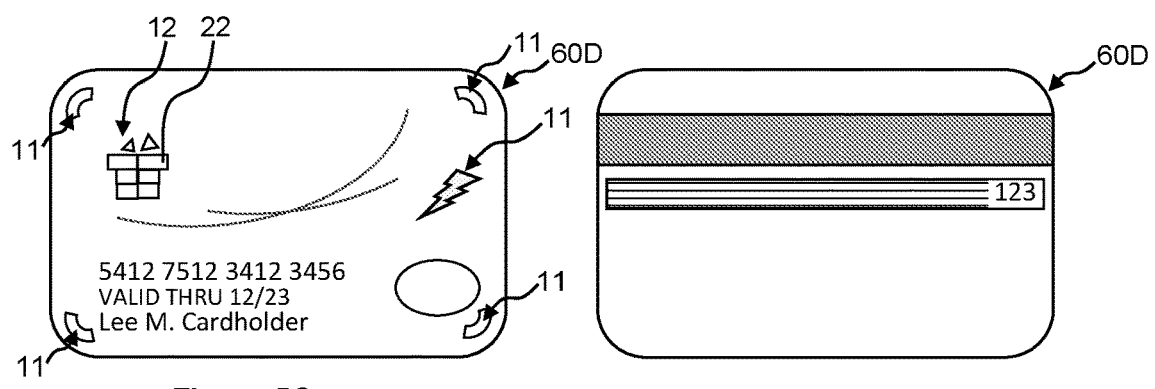
Figure 5C
Figure 5D

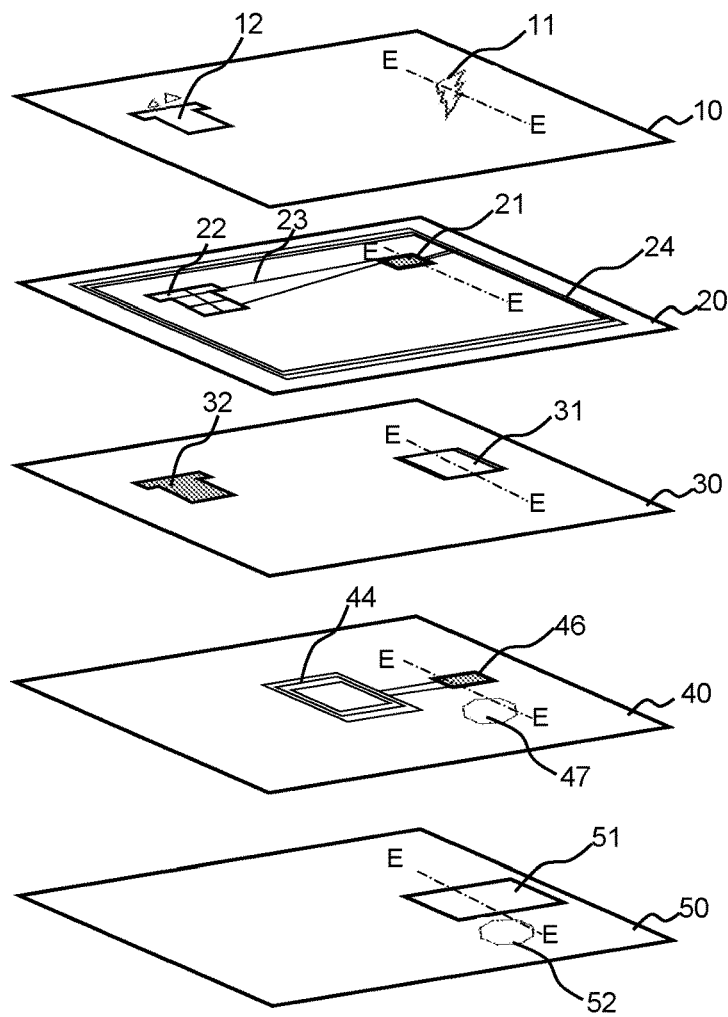
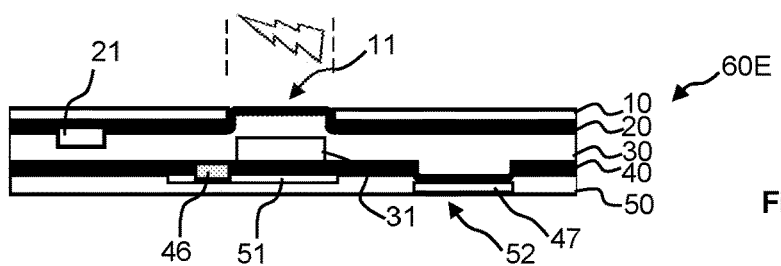
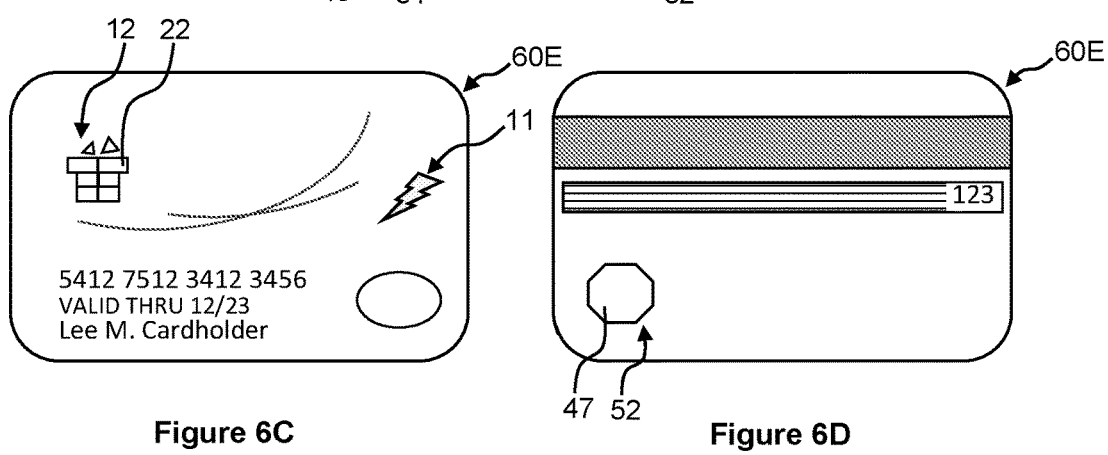
Figure 6A
Figure 6B
Figure 6C
Figure 6D

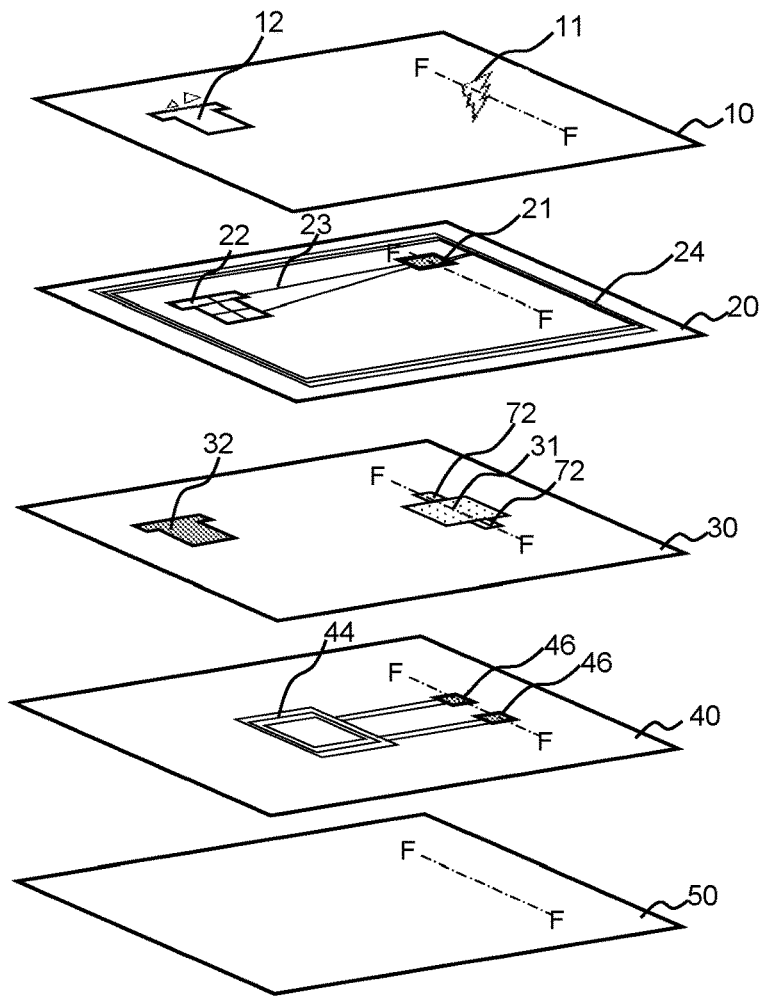
Figure 7A
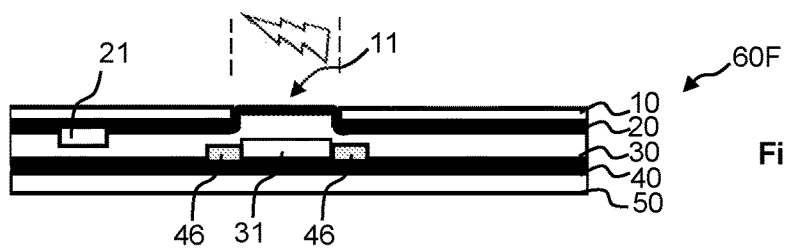
Figure 7B
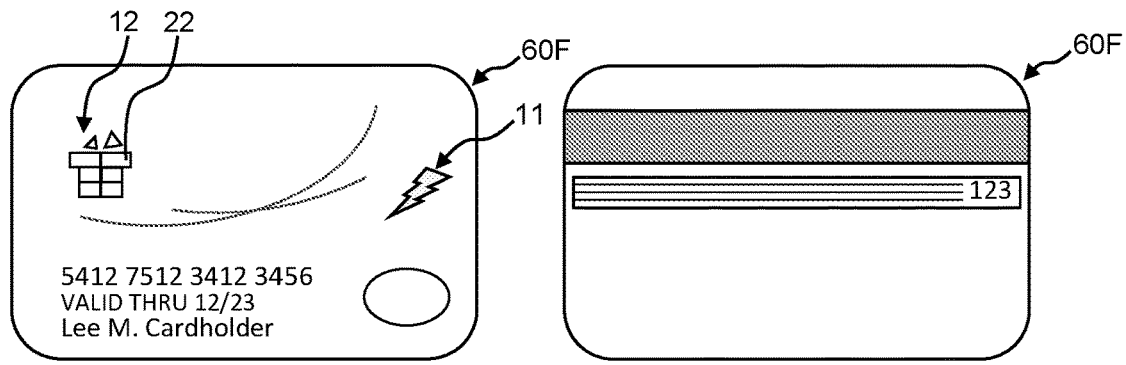
Figure 7C
Figure 7D

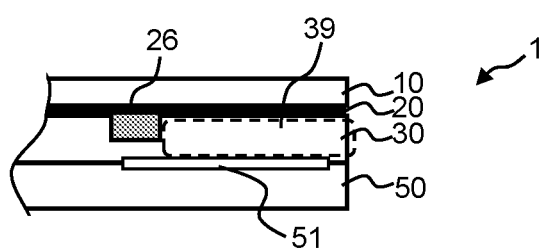
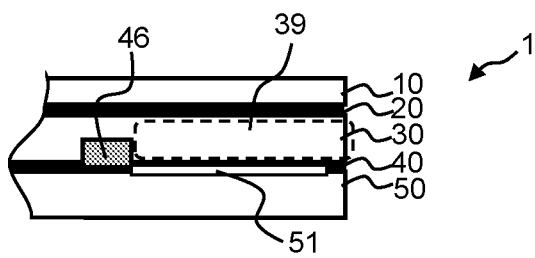
Figure 8A        Figure 8B
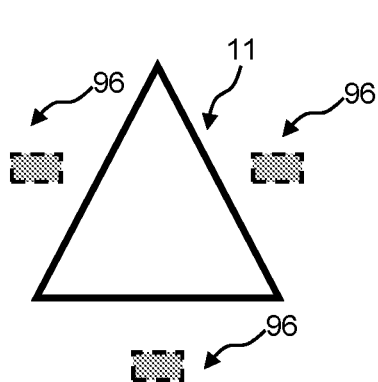
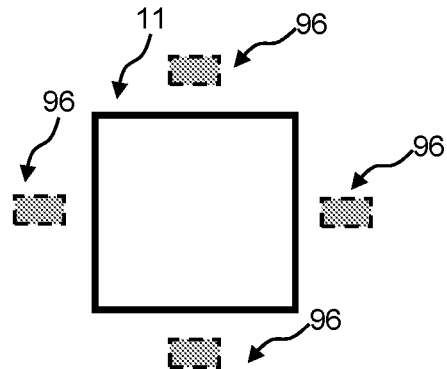
Figure 9A        Figure 9B
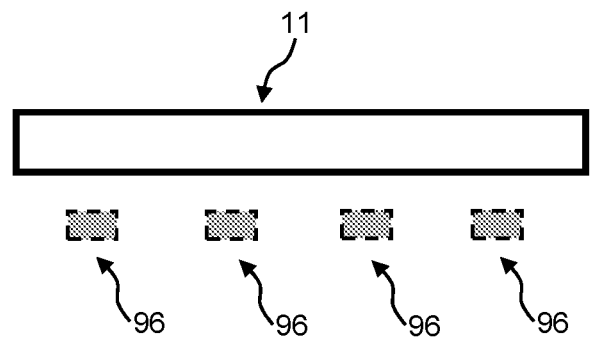
Figure 9C

SMART CARDS HAVING LED AND METHODS FOR FABRICATION THEREOF

CROSS REFERENCE TO RELATED APPLICATIONS

The present application is the U.S. national phase under 35 U.S.C. 371 of international patent application number PCT/SG2021/050407 filed on Jul. 12, 2021, which designated the U.S., and which claimed priority to US provisional patent application number 63/061,646 filed on Aug. 5, 2020, which are incorporated herein by reference.

FIELD

Embodiments of the invention relate to smart card devices having Light-Emitting Diode (LED) module(s), laminated cores for fabricating such smart card devices, and manufacturing methods thereof.

BACKGROUND

Dual interface smart card provides both direct contact and contactless interfaces for performing transactions with contact-type card reader and contactless type card reader.

When performing contactless transactions, a user typically brings a smart card proximate to a contactless type card reader which may be incorporated in a payment terminal. In many instances, the payment terminal may not be facing the user and hence the user may not be promptly informed of the card transaction or that his smart card has been read unless the payment terminal provides an audible or visual feedback to indicate the card transaction or data communication between the card and card reader.

Smart cards that provide a visual feedback, e.g. illumination, have been developed, however, many cards provide insufficient illumination and/or suffer from other issues, e.g. insufficient power.

To overcome these and other issues, improved smart cards and methods of fabrication are highly desired.

SUMMARY

According to a first aspect of the invention, a smart card device comprises:
  a laminated core comprising: a front substrate; a first flexible sheet having a card circuitry formed thereon; a first substrate; a second flexible sheet having an inductive circuitry formed thereon, and a second substrate in a top-to-bottom order,
  wherein the front substrate provides at least one first opening which defines a perforated design and a second opening through which a contact pad is exposed,
  wherein the card circuitry includes: a flip chip, a first antenna coil conductively coupled to the flip chip, the contact pad, at least one conductor path conductively coupling the contact pad to the flip chip,
  wherein the inductive circuitry includes at least one LED module arranged proximate to the at least one first opening and a second antenna coil conductively coupled to the at least one LED module, and
  wherein the first substrate includes at least one light guide which is arranged under the at least one first opening and configured to direct an illumination produced by the at least one LED module through the at least one first opening to illuminate the perforated design.

In an embodiment of the first aspect of the invention, the smart card further comprises
  at least one reflector arranged at a position which is between the second flexible sheet and the second substrate, and under the at least one LED module, wherein the at least one reflector is configured to direct the illumination to the at least one light guide.

In an embodiment of the first aspect of the invention, the at least one light guide
  includes either one of the following:
    a stacked arrangement comprising a plurality of polyethylene terephthalate (PET) and/or polyvinyl chloride (PVC) layers, wherein a surface of at least one of the plurality of PET and/or PVC layers is roughened, wherein the stacked arrangement is arranged within a third opening which is formed in the first substrate; and
    an integral and roughened surface portion of the first substrate.

In an embodiment of the first aspect of the invention, the at least one first opening includes a plurality of first openings which define a plurality of perforated designs; the at least one light guide includes a plurality of light guides arranged under the plurality of first openings; the at least one LED module includes a plurality of LED modules arranged proximate to the plurality of first openings; the at least one light guide includes a plurality of light guides which are arranged under the plurality of first openings and configured to direct the illumination produced by the plurality of LED modules through the plurality of first openings to illuminate the plurality of perforated designs; the at least one reflector includes a plurality of reflectors which are arranged between the second flexible sheet and the second substrate, and under the plurality of LED modules; and the plurality of reflectors are configured to direct the illumination to the plurality of light guides.

In an embodiment of the first aspect of the invention, the at least one light guide includes a layer of light diffusing ink applied on a surface of the first substrate, and wherein the at least one LED module is arranged at an edge of the layer of light diffusing ink.

In an embodiment of the first aspect of the invention, the card circuitry includes an additional LED module which is conductively coupled to the first antenna coil and arranged proximate to the at least one first opening such that the at least one light guide is configured to additionally direct an illumination produced by the additional LED module to the at least one first opening.

In an embodiment of the first aspect of the invention, in addition to at least one LED module, the smart card further comprises the second flexible sheet includes a label formed thereon, wherein the second substrate provides a fourth opening through which the label is exposed.

In an embodiment of the first aspect of the invention, the first substrate includes a thermoformed projection arranged under the contact pad.

In an embodiment of the first aspect of the invention, the smart card further comprises the first substrate includes a PVC and/or PET layer.

In an embodiment of the first aspect of the invention, at least the first substrate or the second substrate includes at least one edge portion which is at least partially transparent.

In an embodiment of the first aspect of the invention, the flip chip is arranged offset relative to the contact pad.

In an embodiment of the first aspect of the invention, the at least one LED module is arranged offset relative to the at least one first opening.

In an embodiment of the first aspect of the invention, the front substrate includes a metallic layer.

In an embodiment of the first aspect of the invention, the at least one first opening includes a plurality of first openings which define a plurality of perforated designs; the at least one light guide includes a plurality of light guides arranged under the plurality of first openings; the at least one LED module includes a plurality of LED modules arranged proximate to the plurality of first openings; the at least one light guide includes a plurality of light guides which are arranged under the plurality of first openings and configured to direct the illumination produced by the plurality of LED modules through the plurality of first openings to illuminate the plurality of perforated designs.

In an embodiment of the first aspect of the invention, a shape of the contact pad is an irregular shape.

According to a second aspect of the invention, a method for fabricating a smart card device, comprises:

perforating a front substrate to form at least one first opening and at least one second opening;

performing thermoforming on a first substrate to form a thermoformed projection on the first substrate;

forming a stacked arrangement using the front substrate, a first flexible sheet having a card circuitry formed thereon, the first substrate having at least one light guide, a second flexible sheet having an inductive circuitry formed thereon, and a second substrate, in a top-to-bottom order, wherein the card circuitry includes: a flip chip, a first antenna coil conductively coupled to the flip chip, the contact pad, and at least one conductor path conductively coupling the contact pad to the flip chip, wherein the inductive circuitry includes at least one LED module conductively coupled to a second antenna coil, wherein forming the stacked arrangement includes: aligning the at least one first opening and the at least one light guide; and aligning the at least one second opening, the contact pad, and the thermoformed projection; and laminating the stacked arrangement to produce a laminated core.

In an embodiment of the second aspect of the invention, forming the stacked arrangement includes arranging at least one reflector at a position which is between the second flexible sheet and the second substrate, and under the at least one first opening.

In an embodiment of the second aspect of the invention, prior to forming the stacked arrangement, the method further comprises either one of the following:

perforating the first substrate to form a third opening, and arranging in the third opening the at least one light guide, which includes another stacked arrangement comprising a plurality of PET and/or PVC layers wherein a surface of at least one of the plurality of PET and/or PVC layers is roughened; and roughening an integral surface portion of the first substrate thereby providing the at least one light guide.

In an embodiment of the second aspect of the invention, the at least one first opening includes a plurality of first openings which define a plurality of perforated designs; wherein the at least one light guide includes a plurality of light guides arranged under the plurality of first openings; wherein the at least one LED module includes a plurality of LED modules arranged proximate to the plurality of first openings; wherein the at least one light guide includes a plurality of light guides which are arranged under the plurality of first openings and configured to direct the illumination produced by the plurality of LED modules through the plurality of first openings to illuminate the plurality of perforated designs; wherein the at least one reflector includes a plurality of reflectors which are arranged between the second flexible sheet and the second substrate, and under the plurality of LED modules, wherein the plurality of reflectors are configured to direct the illumination to the plurality of light guides.

In an embodiment of the second aspect of the invention, prior to forming the stacked arrangement, the method further comprises:

perforating the first substrate to form at least one third opening; and applying, on the first substrate, a light diffusing ink on a surface portion adjacent to the at least one third opening, and wherein the forming the stacked arrangement includes: receiving the at least one LED module within the at least one third opening.

In an embodiment of the second aspect of the invention, the card circuitry includes an additional LED module which is conductively coupled to the first antenna coil.

In an embodiment of the second aspect of the invention, in addition to at least one LED module, the second flexible sheet includes a label formed thereon, the method further comprising:

perforating the second substrate to form at least one fourth opening;

wherein arranging the stacked arrangement includes: aligning the label with the at least one fourth opening.

In an embodiment of the second aspect of the invention, prior to performing thermoforming on the first substrate to form the thermoformed projection on the first substrate, the method further comprises:overlaying a PVC layer on a PET layer to provide the first substrate.

In an embodiment of the second aspect of the invention, at least the first substrate or the second substrate includes at least one edge portion which is at least partially transparent.

In an embodiment of the second aspect of the invention, the flip chip is arranged offset relative to the contact pad.

In an embodiment of the second aspect of the invention, the at least one LED module is arranged offset relative to the at least one first opening.

In an embodiment of the second aspect of the invention, the front substrate includes a metallic layer.

In an embodiment of the second aspect of the invention, the at least one first opening includes a plurality of first openings which define a plurality of perforated designs; wherein the at least one light guide includes a plurality of light guides arranged under the plurality of first openings; wherein the at least one LED module includes a plurality of LED modules arranged proximate to the plurality of first openings; wherein the at least one light guide includes a plurality of light guides which are arranged under the plurality of first openings and configured to direct the illumination produced by the plurality of LED modules through the plurality of first openings to illuminate the plurality of perforated designs.

In an embodiment of the second aspect of the invention, the method further comprises: dicing the laminated core to provide a plurality of smart card devices.

In an embodiment of the second aspect of the invention, a shape of the contact pad is an irregular shape.

BRIEF DESCRIPTION OF DRAWINGS

Embodiments of the invention will be described in detail with reference to the accompanying drawings, in which:

FIGS. 2A to 2D show various views of one embodiment;

FIGS. 3A to 3D show various views of one embodiment;

FIGS. 4A to 4D show various views of one embodiment;

FIGS. 5A to 5D show various views of one embodiment;

FIGS. 6A to 6D show various views of one embodiment;

FIGS. 7A to 7D show various views of one embodiment;

FIGS. 8A and 8B show embodiments having transparent edge portion; and

FIGS. 9A to 9C show schematic views of arrangements of LED modules.

DETAILED DESCRIPTION

Figure 1:
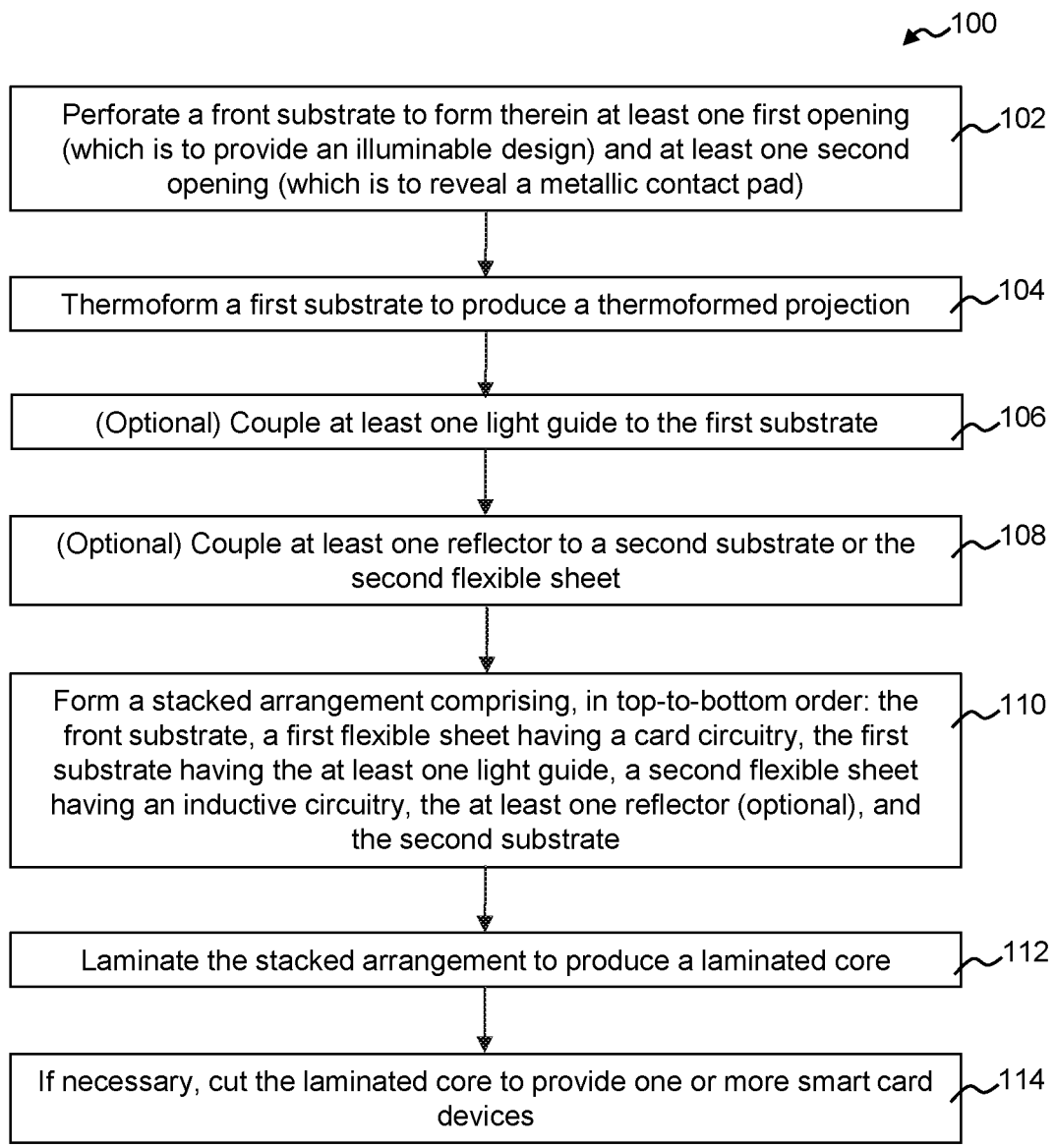
FIG. 1 is a flow chart describing a method of fabricating smart card devices having LED module.

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention. In the drawings, like reference labels or numerals refer to same or similar functionalities or features throughout the several views.

Embodiments described in the context of one of the devices or methods are analogously valid for the other devices or methods. Similarly, embodiments described in the context of a device are analogously valid for a method, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

It should be understood that the articles "a", "an" and "the" as used with regard to a feature or element include a reference to one or more of the features or elements. The term "and/or" includes any and all combinations of one or more of the associated feature or element. The terms "comprising", "including", "having", and any of their related terms, as used in description and claims, are intended to be open-ended and mean that there may be additional features or elements other than the listed ones. Identifiers such as "first", "second", "third", and so on, are used merely as labels, and are not intended to impose numerical requirements on their objects, nor construed in a manner imposing any relative position or time sequence between limitations. Furthermore, terms such as "top", "bottom", "side", "under", "over", "front", "back" used herein are merely for ease of description and refer to the orientation of the features or elements as shown in at least some of the figures. It should be understood that any orientation of the features described herein is within the scope of the invention. The term "under" when used in context with an element refers to directly below the element, e.g. no other intervening element, or indirectly below the element, e.g. separated by another element. The term "on" when used in context with an element refers to having contact with the element whether above or under the element.

The term "side" when used in context with an element, e.g. flexible sheet, substrate, laminated core, may include a reference to a surface, of the element, having largest surface area among surfaces of the element. The term "edge" when used in context with the same element may include a reference to a surface, of the element, having lesser or least surface area among surfaces of the element, wherein such reference may include a boundary of the largest surface area. In the context of a smart card, the term "side" may refer to a front surface which exposes the metallic contact pad for contact-type mode and optionally card user details, and/or to a back surface which is opposed to the front surface and may provide a magnetic strip. In the context of a smart card, the term "edge" may refer to a surface which is generally transverse to the front and back surface, and may provide a thickness of the smart card device.

The terms such as "front" and "back" used herein are merely for ease of description and refer to typical orientation of the features or elements when in use. In context of smart card having opposed sides, the term "front" typically refers to a side of the smart card which presents a metallic contact pad and optionally card user details while the term "back" typically refers to the other or opposed side which may provide a magnetic strip.

The phrase "conductively coupled" and related phrase include a reference to capability to transfer of electrical energy or current between elements by physical contact or electrically conductive medium. The phrase "inductively coupled" and related phrase include a reference to capability to transfer of electrical energy or current between elements by electromagnetic induction or a common changing magnetic field, i.e. without physical contact between the elements. The phrase "operably coupled" and related phrase include a reference to "conductively coupled" or "inductively coupled". The phrase "coupled to" in context with an element includes a reference to having contact with, e.g. applied or arranged on, interlocked with, placed on, the element.

The term "reflection" includes references to specular reflection and/or diffusion reflection.

The phrase "at least partially transparent" when used in context with an element, e.g. flexible sheet and substrate, may include references to one of the following: the element may be homogeneously translucent (or semi-transparent); the element may be homogeneously transparent; the element may include at least one portion which is transparent while at least another portion is translucent or opaque.

The phrase "smart card" includes references to transaction cards, electronic devices such as, but not limited to, key fobs, watches, subscriber identification modules used in mobile phones, USB-based tokens, Secure Digital (SD), mini/micro SD, Multi-Media Card (MMC), VQFN8, SSOP20, TSSOP20, MemorySticks cards, etc.

According to some aspects of the invention, methods for fabricating laminated core(s) each having at least one LED module(s) and methods for fabricating smart card(s) incorporated such laminated core(s) are provided.

According to some embodiments, methods for fabricating smart card device are described with reference to a flowchart 100 of FIG. 1.

In block 102, a front substrate is perforated to form therein at least one first opening (alternatively referred to as "first opening") which is to provide at least one illuminable design and at least one second opening (alternatively referred to as "second opening") which is to expose a metallic contact pad. The second opening may be perforated in a separate step or same step as perforating the front substrate to form the first opening.

In block 104, a first substrate is thermoformed to produce a thermoformed projection on the first substrate. The thermoformed projection is to raise up the metallic contact pad during lamination in block 112. Thermoforming may be performed by stacking a metal template, having an opening customized to the desired thermoforming design, on the substrate; subjecting this stacked arrangement to high temperature and/or pressure such as by lamination; and removing the metal template from the thermoformed first substrate.

In block 106, the first substrate is provided with a light guide which may be implemented in various ways.

In an example wherein the light guide is provided by a stacked arrangement of polyethylene terephthalate (PET) and/or polyvinyl chloride (PVC) layers, the first substrate is perforated to form therein at least one third opening (alternatively referred to as "third opening"). The light guide is arranged within the third opening. For example, the light guide may be arranged within the third opening of the first substrate by adhering thereto, interlocking therewith, or placement thereon. At least a surface of one of the layers forming the light guide may be processed, e.g. roughened, to produce surface defects or unevenness which diffuse or scatter incident light. In this example, the light guide is a separate element coupled to the first substrate.

In another example, the light guide may be provided by an integral portion of the first substrate. In particular, at least one integral surface portion of at least one side of the first substrate is processed, e.g. roughened, to provide surface defects or unevenness.

In another example wherein the light guide is provided by light diffusing ink, the first substrate is perforated to form therein at least one third opening which is to receive a LED module therein later. The light diffusing ink is applied to a surface portion of the first substrate which is adjacent to the third opening.

Block 106 may take place separately or interchanged with block 104.

In block 108, at least one reflector is coupled to a second substrate, e.g., its top surface, or coupled to the second flexible sheet, e.g., its bottom surface. In some examples, block 108 may be omitted as the second substrate or the second flexible sheet may be pre-attached with a reflector prior to this block or a reflector may be coupled to the second substrate or second flexible sheet when performing block 110. In some examples, such as when the light guide is provided by light diffusing ink, reflector may be omitted.

In block 110, a stacked or juxtaposed arrangement is formed. The stacked arrangement comprises, in a top-to-bottom order, the front substrate, a first flexible sheet having a card circuitry, the first substrate having the at least one light guide, a second flexible sheet having an inductive circuitry, and the second substrate. Forming the stacked arrangement may include: aligning the at least one first opening and the at least one light guide; and aligning the at least one second opening, a metallic contact pad of the first flexible sheet, and the thermoformed projection of the first substrate. Prior to or in this block, adhesives may be applied to at least some of the components forming the stacked arrangement.

In some examples where reflector is required, forming the stacked arrangement includes arranging at least one reflector at a position which is between the second flexible sheet and the second substrate, and under the at least one first opening.

In some examples where the light guide is provided by an applied layer of light diffusing ink, forming the stacked arrangement includes receiving the at least one LED module into the at least one third opening.

In block 112, the stacked arrangement of block 110 is laminated to produce a laminated core. During lamination, the thermoformed projection pushes the contact pad into the second opening of the front substrate; a light diffusion channel is formed by the juxtaposed and aligned arrangement of the reflector, light guide, and the first opening.

In block 114, the laminated core may be cut or diced to provide at least one individual section, e.g. ID 1 size according to International Standard Organisation (ISO) 7810, wherein each individual section includes a smart card device. Each individual section may be further processed, e.g. personalised, before issuing to a consumer. In some other examples, individual section(s) may be of other dimensions or form factors suitable as other smart or electronic devices.

It is to be appreciated that the above-described method may be modified or varied, as follows.

For example, sequence of some operations may be interchanged, performed separately, and/or combined. In particular, at least blocks 102, 104, 106, and 108 may be interchanged; block 102 may require separate perforation steps; the first opening and the third opening may be perforated in a single step using a stacked arrangement of the front substrate and the first substrate; blocks 110 and 112 may be performed without earlier blocks if the front substrate and the first substrate have been pre-processed appropriately.

For example, the second flexible substrate may include a label formed thereon which is to be exposed after lamination. In this regard, the second substrate may be perforated to provide at least one fourth opening which is to expose the label; in block 110, forming the stacked arrangement may include: aligning the at least one fourth opening of the second substrate and the feature of the second flexible sheet.

For example, the stacked arrangement of block 110 may further include a first transparent layer and a second transparent layer respectively arranged at the top and bottom of the stacked arrangement. In this regard, the method may further include perforating the first transparent layer to form at least one fifth opening which is to expose the metallic contact pad. This perforating step may be performed by stacking the first transparent layer on the front substrate, and then perforating this stacked arrangement to form the second opening and the fourth opening with a same perforation step.

For example, the laminated core may provide multiple smart card devices.

Elements common to various embodiments, e.g. front substrate 10, first flexible sheet 20, first substrate 30, light guide 31, second flexible sheet 40, reflector 51, second substrate 50, reflector 51, and LED module 26, 46 are described with reference to the FIGS. 2A to 2D, 3A to 3D, 4A to 4D, 5A to 5D, 6A to 6D, and 7A to 7D.

The front substrate 10 includes opposed sides, e.g. top side and bottom side, wherein the top side exposes a metallic contact pad 22 of the first flexible sheet 20 and optionally includes artwork printing, wherein the top side may be juxtaposed to a transparent layer or overlay while the bottom side is juxtaposed to the first flexible sheet 20. The front substrate 10 provides at least one first opening 11 and at least one second opening 12. The first opening 11 defines a shape or customised design, e.g. logo, trade mark, sign, symbol, character, to provide an illuminable design. The first opening 11 may include a single aperture or a pattern or plurality of apertures depending on the requirements of the illuminable design. The first opening 11 allows light produced within the smart card device 60A, 60B, 60C, 60D, 60E, 60F to illuminate therethrough and to be observed by human eye viewing the top side of the front substrate 10. In the laminated core, the second opening 12 is aligned to the contact pad 22 of the first flexible sheet 20 and allows the contact pad 22 project therethrough to allow conductive coupling with a contact-type smart card reader during card operation. While the position of the second opening 12 is designated by ISO specification, the position of the first opening 11 on the front substrate 10 is generally less restricted.

In the laminated core, at the front substrate 10, a space provided by the first opening 11 is substantially filled with an extruded portion of at least the first flexible sheet 20 and optionally the first substrate 30 such that this extruded portion is substantially flush with the top side of the front substrate 10. The extrusion portion may be formed during lamination of the stacked arrangement, during which the first flexible sheet 20 and optionally the first substrate 30 are softened due to pressure and temperature conditions during lamination and thereby urged into the space in the first opening 11 of the front substrate 10. As any further extrusion beyond the first opening 11 are constrained by laminator plates applied to the top side of the front substrate 10, the extruded portion is eventually substantially flush with the top side of the front substrate 10.

The front substrate 10, other than at the openings, may be generally opaque but, in some examples, the front substrate 10 may include at least one transparent portion. The front substrate 10 may include a polyvinyl chloride (PVC) material. In some examples for producing metal smart card, the front substrate 10 may include a metallic material or be replaced by a metallic substrate.

The first flexible sheet 20 includes opposed sides, e.g. top side and bottom side, wherein the top side is juxtaposed to the front substrate 10 while the bottom side is juxtaposed to the first substrate 30. The first flexible sheet 20 includes a card circuitry, e.g. conductor pattern, provided or formed thereon for performing card transaction and data communication operation. Providing or forming a circuitry, e.g. conductor pattern, on a flexible sheet may include dry etching a metallisation layer, e.g. aluminium, plated on the flexible sheet. Each card circuitry includes at least one flip chip 21 or electronic chip, a contact pad 22, a plurality of conductor paths 23 having at least one conductor path conductively coupling the contact pad 22 to the flip chip 21, a metal coil (alternatively referred to as "first antenna coil 24") conductively coupled to the flip chip 21. The contact pad 22 is to provide contact-based signal transmission with a contact-based card reader while the first antenna coil 24 is to provide contact-free signal transmission to a contactless card reader. The contact pad 22 may be formed on the top side of the first flexible sheet 20. The contact pad 22 may have dimensions and layout in accordance with ISO or other industry standards. The contact pad 22 may be provided as a regular shape, e.g. rectangle, square; or a modified regular shape, e.g. round rectangle, rounded square; or an irregular or customised shape, e.g. logo, trade mark, sign, symbol, character, as long as pinout positions of the contact pad 22 conform to ISO or other industry standards. Irregular or customised shape may be a pattern comprising regular and/or modified regular shapes, a representation of known object, e.g. leaf, animal, but is not limited as such. Conductor paths, including the first antenna coil 24, may be formed on the top side or bottom side of the first flexible sheet 20. The contact pad 22, conductor paths, e.g. 23, first antenna coil 24 may be formed using the aforementioned dry-etching of a metallisation layer plated on the first flexible sheet 20. The flip chip 21 may be provided on the bottom side of the first flexible sheet 20 in some examples or on the top side in other examples. The flip chip 21 may be arranged offset relative to the contact pad 22 in some examples. The offset arrangement of the contact pad 22 relative to the flip chip 21 provides a dis-aligned and non-overlapping relationship. In other words, areas on the first flexible sheet 20 respectively defined by the contact pad 22 and the flip chip 21 are dis-aligned and non-overlapping along a direction which is transverse to a planar surface defined by either side of the first flexible sheet 20. However, in some other examples, the flip chip 21 may be aligned relative to the contact pad 22, e.g. the flip chip 21 may be arranged directly under the contact pad 22 but separated by a flexible sheet therebetween.

The first flexible sheet 20 may be transparent or at least partially transparent. The first flexible sheet 20 may include a PET material.

The first substrate 30 includes opposed sides, e.g. top side and bottom side, wherein the top side is juxtaposed to the first flexible sheet 20 while the bottom side is juxtaposed to the second flexible sheet 40 (see FIGS. 2A to 2D, 3A to 3D, 4A to 4D, 5A to 5D, 6A to 6D, 7A to 7D). The first substrate 30 provides a light guide 31 which location is aligned with the first opening 11 of the front substrate 10. The light guide 31 refers to any element configured to diffuse or scatter incident light and direct diffused or scattered light, for example, towards the at least one first opening. For example, the light guide 31 may include a at least partially transparent material configured to receive light through its back surface or its side, subject the light to internal reflection within the light guide 31, and direct reflected light through its front surface so that a diffused light is emitted through the first opening 11.

Various implementations of the light guide 31 may be envisaged. In an example, the light guide 31 is provided by a stacked arrangement comprising multiple PET and/or PVC layers which may be laminated together. The front and/or the back surface of the stacked arrangement may be roughened to produce surface defects or unevenness which diffuse or scatter incident light; alternatively, at least one of the PET and/or PVC layers may be roughened. The stacked arrangement may be arranged in a third opening of the first substrate 30 by adhering thereto, by interlocking therewith, or placement thereon. In this example, the first substrate 30 may be opaque or at least partially transparent.

In another example, the light guide may be provided by an integral portion of the first substrate. In particular, at least one integral surface portion of at least one side of the first substrate is processed, e.g. roughened, to provide surface defects or unevenness.

In another example (see FIGS. 7A to 7D), the light guide 31 is provided by a layer of light diffusing ink applied, e.g. screen-printed, at a surface area of the first substrate 30 which is aligned to the first opening 11. The light diffusing ink may be invisible or transparent in natural or artificial light condition or without any lighting, but will light up when a light source illuminates an edge of the layer of light diffusing ink to produce a diffused illumination over an area applied with the ink. The light diffusing ink may be a multi-component solvent-based ink. In this example, the first substrate 30 may be transparent or at least partially transparent.

The first substrate 30 further includes a projection 32 from the top side of the first substrate 30. The projection 32 may be referred to as a thermoformed projection 32 if it is fabricated by thermoforming process. The projection 32 may be fabricated by other process. As the projection 32 is to raise up the contact pad 22 of the first flexible sheet 20 during lamination, its location on the first substrate 30 is configured to juxtapose the contact pad 22 in the laminated core.

In some examples, the first substrate 30 may comprise a PVC or PET material. In some other examples, the first substrate 30 may comprise a thermoformed product of a PVC material and a PET material.

The second flexible sheet 40 includes opposed sides, e.g. top side and bottom side, wherein the top side is juxtaposed to the first substrate 30 while the bottom side is juxtaposed to the second substrate 50 and/or a reflector 51. The second flexible sheet 40 may include an inductive circuitry, e.g. conductor pattern, provided or formed thereon such as by dry etching a metallisation layer plated on the second flexible sheet 40. The inductive circuitry includes at least one LED module 46 and the second antenna coil 44, which is a metal or inductor coil, conductively coupled thereto. In operation, when the smart card device 60A, 60B, 60C, 60D, 60E, or 60F is brought within a prescribed proximity of a contactless card reader to implement contact-free signal transmission, the second antenna coil 44 inductively couples with an oscillating magnetic field of the card reader and possibly with the first antenna coil 24 of the first flexible sheet 20. This inductive coupling produces an electric current in the inductive circuitry to operate the LED module 46 of the second flexible sheet 40. At the same time, the first antenna coil 24 inductively couples with an oscillating magnetic field of the card reader to produce an electric current in the card circuitry to operate flip chip 21 or electronic chip, and any LED module 26 included in the card circuitry.

The LED module 46 and inductive circuitry may be provided on the same or different side of the second flexible sheet 40 and may be embedded in the bottom side of the first substrate 30 and/or the top side of the second substrate 50 accordingly.

The second antenna coil 44 may have smaller dimensions, in terms of length and/or coils as compared to the first antenna coil 24. The second antenna coil 44 may be formed on a centre or non-centre portion of the second flexible sheet 40 and occupy lesser surface area as compared to the first antenna coil 24.

In an example, in addition to LED module 46, the second flexible sheet 40 may further include at least one reflector 51 formed on the bottom side of the second flexible sheet 40 to provide a reflective surface and optional heat sink to dissipate heat generated by the LED module.

The second flexible sheet 40 may be transparent or at least partially transparent. The second flexible sheet 40 may include a PET material.

The LED module 26, 46 or device may be provided as top-emitting or side-emitting. In a top-emitting LED module, direction of illumination is along the direction of mounting the module. In a side-emitting LED module, direction of illumination is at a predefined angle to the direction of mounting the module. The predefined angle of illumination may be about 90 degrees, 45 degrees or other angles as required.

In some embodiments, one or more LED modules 46 may be provided by the second flexible sheet 40 only (see FIGS. 2A to 2D, 3A to 3D, 5A to 5D, 6A to 6D, 7A to 7D). In operation, when the smart card device 60A, 60B, 60D, 60E, or 60F is brought to a prescribed proximity of a contactless card reader, an electric current induced in the first antenna coil 24 powers or operates the card circuitry; substantially at the same time, another electric current induced in the second antenna coil 44 powers or operates the inductive circuitry, including the at least one LED module 46.

In some other embodiments, LED modules 26, 46 may be provided by both the first flexible sheet 20 and the second flexible sheet 40 (see FIGS. 4A to 4D). In these embodiments, one or more LED modules 26 may be provided by card circuitry of the first flexible sheet 20. The LED module 26 may be conductively coupled to the conductor pattern, e.g. first antenna coil 24, of the first flexible sheet 20. In operation, when the smart card device 60C is brought to a prescribed proximity of a contactless card reader, an electric current induced in the first antenna coil 24 powers or operates the card circuitry and the LED module(s) 26 while another electric current induced in the second antenna coil 44 powers or operates the LED module(s) 46. Both induced electric currents may operate and illuminate the LED modules 26, 46 substantially at the same time.

Generally, the positioning of LED modules 46 and the second antenna coil 44 on the second flexible sheet 40 is generally unrestricted as the card circuitry is provided on the first flexible sheet 20. This translates into generally unrestricted positioning of the illuminable design on the front substrate.

The second (back) substrate includes opposed sides, e.g. top side and bottom side, wherein the top side is juxtaposed to the second flexible sheet 40 while the bottom side may be juxtaposed to a transparent layer or overlay. The bottom side may include a magnetic strip and optional artwork printing.

The second substrate 50 may be generally opaque but, in some examples, the second substrate 50 may include at least one transparent portion. The second substrate 50 may comprise a PVC material.

In some embodiments (see FIGS. 6A to 6D), the second substrate 50 may provide at least one fourth opening 52 for exposing a label 47 formed on the second flexible sheet 40.

The reflector 51 is configured to reflect incident light produced by the LED module 26, 46, including diffusing the light. The reflector 51 may include a metallic material, e.g. metal foil. The reflector 51 may include an even and/or uneven reflective surface. A laminated core may include one or more reflectors 51. In embodiments (see FIGS. 5A to 5D) where a plurality of reflectors 51 are provided, the reflectors 51 may be arranged at one or more locations within the laminated core depending on the number of LED modules.

The reflector 51 may be provided as a discrete element which may be placed on the second substrate 50, or formed on a carrier or at least a portion of a second flexible sheet 40 such as by dry etching a metallisation layer plated thereon.

In some examples, the reflector 51 may be juxtaposed to, e.g. in direct contact with, the LED module 46.

In some embodiments of the laminated core, the at least one LED module 26, 46 may be arranged in cooperation with the at least one reflector and/or the at least one light guide 31 such that the first opening 11 may be illuminated directly by the LED module 26, 46 and/or indirectly by its reflected and/or diffused illumination. This juxtaposition of the first opening 11, the light guide 31, and the reflector 51 provides a light diffusion channel for producing diffused illumination at the first opening 11 from one or more point light sources (LED modules). In some embodiments where the front substrate 10, the first substrate 30, and the second substrate 50 are substantially opaque other than at the openings, there would be no leakage of illumination except via the first opening 11.

In some examples, reflector may be omitted. One such example is illustrated by FIGS. 7A to 7D in which the light guide is provided by a layer of diffusing ink.

FIGS. 2A, 3A, 4A, 5A, 6A, and 7A are exploded views of stacked arrangements of block 110 in accordance with some embodiments. To avoid obscuring the disclosure, each of these figures shows various layers having components for producing one smart card device after lamination and optional cutting, but it is to be appreciated that each layer may provide an array of the shown components for producing multiple smart card devices after lamination and cutting. FIGS. 2B, 3B, 4B, 5B, 6B, and 7B show laminated cores or smart card devices of block 112 or 114 in accordance with some embodiments. FIGS. 2C, 3C, 4C, 5C, 6C, and 7C show front views of smart card devices while FIGS. 2D, 3D, 4D, 5D, 6D, and 7C respectively show back views of the smart card devices.

FIG. 2A shows an exploded view of a stacked arrangement comprising: a front substrate 10, a first flexible sheet 20 having a card circuitry, a first substrate 30 incorporated with at least one light guide 31, a second flexible sheet 40 having an inductive circuitry, and a second substrate 50 arranged with the at least one reflector 51. In this arrangement, one LED module 46 is provided at the second flexible sheet 40 and conductively coupled to a conductor pattern, e.g. second antenna coil 44, which is formed on the second flexible sheet 40

FIG. 2B shows a partial simplified cross-sectional view of a smart card device 60A which may result from the arrangement of FIG. 2A. The LED module 46 is embedded in the top side of the second substrate 50. The LED module 46 and the reflector 51 are arranged under and/or in the proximity of the first opening 11 of the front substrate 10. Light or illumination produced by the LED module 46 is reflected by the reflector 51. The reflected light at least passes through the light guide 31, the first flexible sheet 20, and through the first opening 11 of the front substrate 10. The light guide 31 is configured to produce diffused reflection from illumination of the LED module 46 and direct the diffused and reflected illumination through its top side towards the first opening 11 of the front substrate 10. This way, illumination viewed from the first opening 11 of the front substrate 10 is diffused.

FIGS. 2C and 2D respectively show top and bottom views of the smart card device 60A which may result from FIG. 2A. The top view shows an illuminable design provided by the first opening 11.

FIG. 3A shows an exploded view of a stacked arrangement comprising: a front substrate 10, a first flexible sheet 20 having a card circuitry, a first substrate 30 incorporated with at least one light guide 31, a second flexible sheet 40 having an inductive circuitry, and a second substrate 50 arranged with the at least one reflector 51. In this arrangement, two LED modules 46 are provided at the second flexible sheet 40 and conductively coupled to a conductor pattern, e.g. second antenna coil 44, which is formed on the second flexible sheet 40.

FIG. 3B shows a partial simplified cross-sectional view of a smart card device 60B which may result from the arrangement of FIG. 3A. The LED modules 46 are embedded in the top side of the second substrate 50, otherwise the relative arrangement of the LED modules 46, the reflector 51 and the first opening 11 is similar to that of FIG. 2B and will not be repeated. FIGS. 3C and 3D respectively show top and bottom views of the smart card device 60B which may result from FIG. 3A. The top view shows an illuminable design provided by the first opening 11.

FIG. 4A shows an exploded view of a stacked arrangement comprising: a front substrate 10, a first flexible sheet 20 having a card circuitry, a first substrate 30 incorporated with at least one light guide 31, a second flexible sheet 40 having an inductive circuitry, and a second substrate 50 arranged with the at least one reflector 51. In this arrangement, at least one LED module 26 is provided at the first flexible sheet 20 and conductively coupled to a conductor pattern, e.g. first antenna coil 24, which is formed on the first flexible sheet 20. Additionally, at least one LED module 46 is provided at the second flexible sheet 40 and conductively coupled to a conductor pattern, e.g. second antenna coil 44, which is formed on the second flexible sheet 40.

FIG. 4B shows a partial simplified cross-sectional view of a smart card device 60C which may result from the arrangement of FIG. 4A. One LED module 26 is embedded in the top side of the first substrate 30 while another LED module 46 is embedded in the top side of the second substrate 50, otherwise the relative arrangement of the LED module 46, the reflector 51 and the first opening 11 is similar to that of FIGS. 2B and 3B and will not be repeated. FIGS. 4C and 4D respectively show top and bottom views of the smart card device 60C which may result from FIG. 4A. The top view shows an illuminable design provided by the first opening 11.

FIG. 5A shows an exploded view of a stacked arrangement comprising: a front substrate 10, a first flexible sheet 20 having a card circuitry, a first substrate 30 incorporated with multiple light guides 31, a second flexible sheet 40 having an inductive circuitry, and a second substrate 50 arranged with multiple reflectors 51. In this arrangement, multiple LED modules 46 are provided at the second flexible sheet 40 and conductively coupled to a conductor pattern, e.g. second antenna coil 44, which is formed on the second flexible sheet 40.

FIG. 5B shows a partial simplified cross-sectional view of a smart card device 60D which may result from the arrangement of FIG. 5A. Multiple LED modules 46 are embedded in the top side of the second substrate 50, otherwise the relative arrangement of the LED modules 46, the reflectors 51 and the first openings 11 is similar to that of earlier Figures and will not be repeated. FIGS. 5C and 5D respectively show top and bottom views of the smart card device 60D which may result from FIG. 5A. The top view shows a plurality of illuminable designs provided by a plurality of first openings 11. In this embodiment, it is shown that a set of LED module 46, light guide 31, and reflector 51 is arranged to illuminate each design at the corner of the smart card 1. However, other variations are possible, e.g. a set of one LED module 46, light guide 31, and reflector 51 may illuminate more than one design; a set of multiple LED modules 46, at least one light guide 31, and at least one reflector 51 may illuminate one design; or a combination thereof.

FIG. 6A shows an exploded view of a stacked arrangement which is similar to FIG. 2A, however, the second flexible sheet 40 additionally includes a label 47 which is to be exposed on a bottom or back side of the laminated core after lamination. FIG. 6B shows a partial simplified cross-sectional view of a smart card device 60E which may result from the arrangement of FIG. 6A. One LED module 46 is embedded in the top side of the second substrate 50, otherwise the relative arrangement of the LED module, the reflector 51 and the first opening 11 is similar to that of FIG. 2B and will not be repeated. FIGS. 6C and 6D respectively show top and bottom views of the smart card device 60E which may result from FIG. 6A. The top view shows an illuminable design provided by the first opening 11. The bottom view shows the label 47 which is formed on the second flexible sheet 40 but exposed or visible through the fourth opening 52. Examples of such labels 47 include security feature, security hologram, logo or other authentication feature.

FIG. 7A shows an exploded view of a stacked arrangement which is mostly similar to FIG. 3A but includes the following modifications. In the arrangement of FIG. 7A, the first substrate 30 includes a thermoformed projection 32, a light guide 31 having light diffusing ink applied on a surface area of the first substrate 30, at least two third openings 72 formed at edge(s) of the diffusing ink area. The second flexible sheet 40 includes an inductive circuitry having two LED modules 46 aligned with the at least two third openings 72. When the first substrate 30 and the second flexible sheet 40 are stacked, the LED modules 46 are arranged within the at least two third openings 72. Upon lamination of a stacked arrangement (see block 110), the first substrate 30 is softened and a portion thereof conforms around the two LED modules 46. Accordingly, in the resulting laminated core, the two LED modules 46 may be juxtaposed to the light guide 31, i.e. area applied with diffusing ink. In the arrangement of FIG. 7A, a reflector is not required between the second flexible sheet 40 and the second substrate 50.

It is to be appreciated that diffusing ink may be used as light guide for any of FIGS. 2A to 2D, 3A to 3D, 4A to 4D, 5A to 5D, 6A to 6D with appropriate modifications and such examples would not require a reflector between the second flexible sheet 40 and the second substrate 50.

In various embodiments, including those illustrated in the figures and/or described in the present disclosure, the first substrate 30 and/or the second substrate 50 may be at least partially transparent in at least one edge portion. At least one reflector may be optionally provided to reflect illumination from a LED module towards the at least partially transparent edge portion. The edge portion may be illuminated by a LED module which is to also illuminate a first opening 11 or by a dedicated LED module. Accordingly, in addition to illuminating the customised design through the first opening 11 of the front substrate 10, an edge portion of the first substrate 30 and/or the second substrate 50 may be illuminated. In some examples, all four edges may be illuminated. In some examples, opposed edges may be illuminated. In some examples, adjacent edges may be illuminated. FIG. 8A shows a partial simplified cross-sectional view of a smart card device having a LED module 26 provided by the first flexible sheet 20 and reflector 51, which are arranged to illuminate a transparent edge portion 39 (see dash line box) of the first substrate 30. FIG. 8B shows a partial simplified cross-sectional view of a smart card device, such as that shown in FIGS. 3B to 3D, having a LED module 46 provided by the second flexible sheet 40 and reflector 51, which are arranged to illuminate a transparent edge portion 39 (see dash line box) of the first substrate 30.

In various embodiments, including those illustrated in the figures and/or described in the present disclosure, multiple LED modules may be provided. FIGS. 9A to 9C are top view schematic diagrams of arrangements of LED modules 96 relative to a design to be illuminated. Although not illustrated, it is to be appreciated that the design may be arranged on the front substrate 10 while the LED modules 96 may be embedded in the first and/or the second substrate 50. In FIG. 9A, a triangular design may be illuminated by three LED modules 96 arranged at the three sides of the design. In FIG. 9B, a square design may be illuminated by four LED modules 96 arranged at the four sides of the design. In FIG. 9C, multiple LED modules 96 may be arranged along a length of the elongate design.

In various embodiments, including those illustrated in the figures and/or described in the present disclosure, multiple LED modules and/or reflective surfaces may be provided and arranged to provide or enable light emission and/or reflection, respectively, in multiple and/or different directions. In particular, a combination of light emission from various LED modules may be multi-directional, including in opposite directions. In some examples, LED modules of top-emitting type may be mounted to the first and the second flexible sheet such that directions of light emission are opposite. In some examples, LED modules of side-emitting type may face opposite and/or adjacent edges. In combination with these or other examples, the reflectors may also be arranged facing multiple and/or different directions, including in opposite directions. In some examples, the reflectors may be arranged at top and bottom sides of the first substrate such that light from at least some of the LED modules undergoes multiple reflections through the first substrate before the reflected light travels through at least one edge of the laminated core being a smart card. In some examples, the reflectors may be arranged at the top side of the first substrate and the bottom side of the second substrate such that light from at least some of the LED modules undergoes multiple reflections through the first substrate before the reflected light travels through at least one edge of the laminated core being a smart card. In some other examples, arrangements of LED modules and reflectors as described in the foregoing examples may be combined.

In various embodiments, including those illustrated in the figures and/or described in the present disclosure, the bottom side of the second (back) substrate may include a customised design to be illuminated by LED module(s) arranged within the laminated core. Accordingly, the second substrate may provide at least a sixth opening to provide at least one illuminable design. In some examples, this customised design may be the same as or complement a customised design provided on the top side of the front substrate such that illumination of both designs conveys a collective or combined design.

In various embodiments, including those illustrated in the figures and/or described in the present disclosure, the LED modules may be activated to convey a status or condition of the smart card device, e.g. working condition of contactless mode, performance of a transaction. In some examples, different colours may be used to differentiate status or condition. In some examples, different parts of the second laminated core being a smart card may be illuminated to differentiate the status or condition to be conveyed. For example, the customised design may be illuminated to indicate normal working condition of contactless mode while at least one edge of the smart card device may be alternatively or additionally illuminated to indicate a successful transaction.

Embodiments of the invention provide several advantages, including but not limited to the following:

Use of one or more reflectors increases irradiation area and therefore illuminates the design more evenly. If a customised design, e.g. first opening 11, has an illumination area which is much larger than irradiation area of an LED module, the customised design may not be illuminated evenly if a single LED module (point light source) is used without reflector. Accordingly, use of one or more reflectors produces diffused illumination which increases irradiation area and therefore illuminates a customised design more evenly.

Furthermore, use of one or more reflectors increases propagation distance of light reflection and therefore enables a LED module arranged at non-edge portion of the laminated core to illuminate an edge portion. Illuminance and propagation distance of light reflection may be further increased by arranging multiple reflectors facing each other.

Yet furthermore, arrangement of one or more reflectors proximate or juxtaposed to LED modules(s) provides heat sink(s) for dissipating heat generated by the LED module(s). This prevents over-heating and failure of the LED module(s).

Use of light guide also contributes to producing diffused illumination which increases irradiation area and therefore illuminates a customised design more evenly.

In some embodiments, the LED module(s) may be arranged offset relative to the customised design, e.g. first opening 11. In other words, the LED module(s) may be dis-aligned with the first opening(s) such that the LED module(s) are not visible through the first opening(s). This offset arrangement, together with the diffusion effect produced by the reflector and light guide, is advantageous in producing an even diffused illumination of the customised design.

Use of inductive circuitry to induce electric current to operate LED module(s) 46 allows electric current flowing through the card antenna, e.g. first antenna coil 24, to be amplified or boosted in the inductive circuitry. This amplified electric current enables operation of multiple LED modules instead of a single LED module and/or enables a LED module of higher power rating or illumination to be used.

Furthermore, in some embodiments, a card circuitry for operating a flip chip and an inductive circuitry for operating LED module are provided by different or multiple flexible sheets which are separated by the first substrate. This is advantageous in providing a more stable operating frequency to allow contactless communication with card reader to meet market technical specification. Furthermore, since the second flexible sheet does not include other circuitry, e.g. card circuitry, the positioning of LED modules and the second antenna coil 44 on the second flexible sheet 40 is generally unrestricted. This increases flexibility, space, and choices in locating LED modules, and also allows additional LED modules to be installed at different locations of the second flexible sheet. This translates into greater flexibility in positioning of illuminable designs on the front substrate.

A side-emitting LED module which is angled at around 90 degrees to the direction of mounting allow emitted light travel to an edge of the substrate or laminated core.

In some embodiments in which the contact pad and the flip chip are dis-aligned and non-overlapping, this offset arrangement reduces the risk of damage to the flip chip even with repeated use from interfacing the contact pad with a contact-type reader.

A thermoformed projection is provided on the first substrate to raise the contact pad into the second opening of the front substrate. The thermoformed projection is useful in reducing lamination time as well as pressure exerted on the LED module during hot lamination process (block 112 of FIG. 1) thereby reducing likelihood of damage to the LED module and increasing output yield.

In some embodiments, the first substrate is thermoformed from a PVC layer and a PET layer. This is advantageous in reducing lamination time as heat from prolonged lamination time may damage LED module.

In some embodiments where a security feature, e.g. security hologram, of the second flexible sheet is exposed through the second (back) substrate, authenticity and validity of the smart card device are enhanced as the security feature is formed on the second flexible sheet and integrally incorporated within the laminated core, i.e. between the first substrate and the second substrate. This is advantageous in preventing fraudulent duplication of smart card.

In embodiments, components are formed or fabricated on flexible sheet, e.g. first flexible sheet 20 and second flexible sheet 40. This is advantageous as consolidating electrical and electronic components, conductive and radio frequency path within a single layer or two layers reduces the cost of production and increases the reliability as too many discrete components could result in weakness during assembly process and in the final product form.

It is to be understood that the embodiments and features described above should be considered exemplary and not restrictive. Many other embodiments will be apparent to those skilled in the art from consideration of the specification and practice of the invention. Furthermore, certain terminology has been used for the purposes of descriptive clarity, and not to limit the disclosed embodiments of the invention.

What is claimed is:

1. A smart card device comprising:
   a laminated core comprising: a front substrate; a first flexible sheet having a card circuitry formed thereon; a first substrate; a second flexible sheet having an inductive circuitry formed thereon, and a second substrate in a top-to-bottom order,
   wherein the front substrate provides at least one first opening which defines a perforated design and a second opening through which a contact pad is exposed,
   wherein the card circuitry includes: a flip chip, a first antenna coil conductively coupled to the flip chip, the contact pad, at least one conductor path conductively coupling the contact pad to the flip chip,
   wherein the inductive circuitry includes at least one LED module arranged proximate to the at least one first opening and a second antenna coil conductively coupled to the at least one LED module, and
   wherein the first substrate includes at least one light guide which is arranged under the at least one first opening and configured to direct an illumination produced by the at least one LED module through the at least one first opening to illuminate the perforated design.

2. The smart card device of claim 1, further comprising:
   at least one reflector arranged at a position which is between the second flexible sheet and the second substrate, and under the at least one LED module, wherein the at least one reflector is configured to direct the illumination to the at least one light guide.

3. The smart card device of claim 2, wherein the at least one light guide includes either one of the following:
   a stacked arrangement comprising a plurality of polyethylene terephthalate (PET) and/or polyvinyl chloride (PVC) layers, wherein a surface of at least one of the plurality of PET and/or PVC layers is roughened, wherein the stacked arrangement is arranged within a third opening which is formed in the first substrate; and
   an integral and roughened surface portion of the first substrate.

4. The smart card device of claim 2 or claim 3,
wherein the at least one first opening includes a plurality of first openings which define a plurality of perforated designs,
wherein the at least one light guide includes a plurality of light guides arranged under the plurality of first openings,
wherein the at least one LED module includes a plurality of LED modules arranged proximate to the plurality of first openings,
wherein the at least one light guide includes a plurality of light guides which are arranged under the plurality of first openings and configured to direct the illumination produced by the plurality of LED modules through the plurality of first openings to illuminate the plurality of perforated designs,
wherein the at least one reflector includes a plurality of reflectors which are arranged between the second flexible sheet and the second substrate, and under the plurality of LED modules, wherein the plurality of reflectors are configured to direct the illumination to the plurality of light guides.

5. The smart card device of claim 1, wherein the at least one light guide includes a layer of light diffusing ink applied on a surface of the first substrate, and wherein the at least one LED module is arranged at an edge of the layer of light diffusing ink.

6. The smart card device of any one of claim 1 to claim 5, wherein the card circuitry includes an additional LED module which is conductively coupled to the first antenna coil and arranged proximate to the at least one first opening such that the at least one light guide is configured to additionally direct an illumination produced by the additional LED module to the at least one first opening.

7. The smart card device of any one of claim 1 to claim 6, wherein the second flexible sheet includes a label formed thereon, wherein the second substrate provides a fourth opening through which the label is exposed.

8. The smart card device of any one of claim 1 to claim 7, wherein the first substrate includes a thermoformed projection arranged under the contact pad.

9. The smart card device of any one of claim 1 to claim 8, wherein the first substrate includes a PVC and/or PET layer.

10. The smart card device of any one of claim 1 to claim 9, wherein at least the first substrate or the second substrate includes at least one edge portion which is at least partially transparent.

11. The smart card device of any one of claim 1 to claim 10, wherein the flip chip is arranged offset relative to the contact pad.

12. The smart card device of any one of claim 1 to claim 11, wherein the at least one LED module is arranged offset relative to the at least one first opening.

13. The smart card device of any one of claim 1 to claim 12, wherein the front substrate includes a metallic layer.

14. The smart card device of claim 1 or claim 5,
wherein the at least one first opening includes a plurality of first openings which define a plurality of perforated designs,
wherein the at least one light guide includes a plurality of light guides arranged under the plurality of first openings,
wherein the at least one LED module includes a plurality of LED modules arranged proximate to the plurality of first openings,
wherein the at least one light guide includes a plurality of light guides which are arranged under the plurality of first openings and configured to direct the illumination produced by the plurality of LED modules through the plurality of first openings to illuminate the plurality of perforated designs.

15. The smart card device of any one of claim 1 to claim 14, wherein a shape of the contact pad is an irregular shape.

16. A method for fabricating a smart card device, the method comprising:
perforating a front substrate to form at least one first opening and at least one second opening;
performing thermoforming on a first substrate to form a thermoformed projection on the first substrate;
forming a stacked arrangement using the front substrate, a first flexible sheet having a card circuitry formed thereon, the first substrate having at least one light guide, a second flexible sheet having an inductive circuitry formed thereon, and a second substrate, in a top-to-bottom order, wherein the card circuitry includes: a flip chip, a first antenna coil conductively coupled to the flip chip, the contact pad, and at least one conductor path conductively coupling the contact pad to the flip chip, wherein the inductive circuitry includes at least one LED module conductively coupled to a second antenna coil,
wherein forming the stacked arrangement includes: aligning the at least one first opening and the at least one light guide; and aligning the at least one second opening, the contact pad, and the thermoformed projection; and
laminating the stacked arrangement to produce a laminated core.

17. The method of claim 16, wherein forming the stacked arrangement includes arranging at least one reflector at a position which is between the second flexible sheet and the second substrate, and under the at least one first opening.

18. The method of claim 17, wherein prior to forming the stacked arrangement, the method further comprising either one of the following:
perforating the first substrate to form a third opening, and arranging in the third opening the at least one light guide, which includes another stacked arrangement comprising a plurality of PET and/or PVC layers wherein a surface of at least one of the plurality of PET and/or PVC layers is roughened; and
roughening an integral surface portion of the first substrate thereby providing the at least one light guide.

19. The smart card device of claim 17 or claim 18,
wherein the at least one first opening includes a plurality of first openings which define a plurality of perforated designs,
wherein the at least one light guide includes a plurality of light guides arranged under the plurality of first openings,
wherein the at least one LED module includes a plurality of LED modules arranged proximate to the plurality of first openings,
wherein the at least one light guide includes a plurality of light guides which are arranged under the plurality of first openings and configured to direct the illumination produced by the plurality of LED modules through the plurality of first openings to illuminate the plurality of perforated designs,
wherein the at least one reflector includes a plurality of reflectors which are arranged between the second flexible sheet and the second substrate, and under the plurality of LED modules, wherein the plurality of reflectors are configured to direct the illumination to the plurality of light guides.

20. The method of claim 16, wherein prior to forming the stacked arrangement, the method further comprising:
perforating the first substrate to form at least one third opening; and
applying, on the first substrate, a light diffusing ink on a surface portion adjacent to the at least one third opening, and
wherein the forming the stacked arrangement includes: receiving the at least one LED module within the at least one third opening.

21. The method of any one of claim 16 to claim 20, wherein the card circuitry includes an additional LED module which is conductively coupled to the first antenna coil.

22. The method of any one of claim 16 to claim 21, wherein the second flexible sheet includes a label formed thereon, the method further comprising:
perforating the second substrate to form at least one fourth opening;
wherein arranging the stacked arrangement includes: aligning the label with the at least one fourth opening.

23. The method of any one of claim 16 to claim 22, wherein prior to performing thermoforming on the first substrate to form the thermoformed projection on the first substrate, the method further comprising:
overlaying a PVC layer on a PET layer to provide the first substrate.

24. The method of any one of claim 16 to claim 23, wherein at least the first substrate or the second substrate includes at least one edge portion which is at least partially transparent.

25. The method of any one of claim 16 to claim 24, wherein the flip chip is arranged offset relative to the contact pad.

26. The method of any one of claim 16 to claim 25, wherein the at least one LED module is arranged offset relative to the at least one first opening.

27. The method of any one of claim 16 to claim 26, wherein the front substrate includes a metallic layer.

28. The method of claim 16 or claim 20,
wherein the at least one first opening includes a plurality of first openings which define a plurality of perforated designs,
wherein the at least one light guide includes a plurality of light guides arranged under the plurality of first openings,
wherein the at least one LED module includes a plurality of LED modules arranged proximate to the plurality of first openings,
wherein the at least one light guide includes a plurality of light guides which are arranged under the plurality of first openings and configured to direct the illumination produced by the plurality of LED modules through the plurality of first openings to illuminate the plurality of perforated designs.

* * * * *

UNITED STATES PATENT AND TRADEMARK OFFICE
CERTIFICATE OF CORRECTION

PATENT NO. : 11,797,817 B2
APPLICATION NO. : 18/040143
DATED : October 24, 2023
INVENTOR(S) : Eng Seng Ng, Sze Yong Pang and Gunenthiran Kailasam It is certified that error appears in the above-identified patent and that said Letters Patent is hereby corrected as shown below:

In the Claims

Column 18, Line 30 through Column 22, Line 28, is incorrect and should be replaced with Claims 1-28 as shown below:

1. A smart card device comprising:
a laminated core comprising: a front substrate; a first flexible sheet having a card circuitry formed thereon; a first substrate; a second flexible sheet having an inductive circuitry formed thereon, and a second substrate in a top-to-bottom order,
wherein the front substrate provides at least one first opening which defines a perforated design and a second opening through which a contact pad is exposed,
wherein the card circuitry includes: a flip chip, a first antenna coil conductively coupled to the flip chip, the contact pad, at least one conductor path conductively coupling the contact pad to the flip chip,
wherein the inductive circuitry includes at least one LED module arranged proximate to the at least one first opening and a second antenna coil conductively coupled to the at least one LED module, and wherein the first substrate includes at least one light guide which is arranged under the at least one first opening and configured to direct an illumination produced by the at least one LED module through the at least one first opening to illuminate the perforated design,
wherein the laminated core further comprises: at least one reflector arranged at a position which is between the second flexible sheet and the second substrate, and under the at least one LED module, wherein the at least one reflector is configured to direct the illumination to the at least one light guide.

2. The smart card device of claim 1, wherein the at least one light guide includes either one of the following:
a stacked arrangement comprising a plurality of polyethylene terephthalate (PET) and/or polyvinyl chloride (PVC) layers, wherein a surface of at least one of the plurality of PET and/or PVC layers is roughened, wherein the stacked arrangement is arranged within a third opening which is formed in the first substrate; and
an integral and roughened surface portion of the first substrate.

Signed and Sealed this
Sixteenth Day of April, 2024

*Katherine Kelly Vidal*

Katherine Kelly Vidal
*Director of the United States Patent and Trademark Office*

3. The smart card device of claim 1,
wherein the at least one first opening includes a plurality of first openings which define a plurality of perforated designs,
wherein the at least one light guide includes a plurality of light guides arranged under the plurality of first openings,
wherein the at least one LED module includes a plurality of LED modules arranged proximate to the plurality of first openings,
wherein the at least one light guide includes a plurality of light guides which are arranged under the plurality of first openings and configured to direct the illumination produced by the plurality of LED modules through the plurality of first openings to illuminate the plurality of perforated designs,
wherein the at least one reflector includes a plurality of reflectors which are arranged between the second flexible sheet and the second substrate, and under the plurality of LED modules, wherein the plurality of reflectors are configured to direct the illumination to the plurality of light guides.

4. The smart card device of claim 1, wherein the at least one light guide includes a layer of light diffusing ink applied on a surface of the first substrate, and wherein the at least one LED module is arranged at an edge of the layer of light diffusing ink.

5. The smart card device of claim 1, wherein the card circuitry includes an additional LED module which is conductively coupled to the first antenna coil and arranged proximate to the at least one first opening such that the at least one light guide is configured to additionally direct an illumination produced by the additional LED module to the at least one first opening.

6. The smart card device of claim 1, wherein the second flexible sheet includes a label formed thereon, wherein the second substrate provides a fourth opening through which the label is exposed.

7. The smart card device of claim 1, wherein the first substrate includes a thermoformed projection arranged under the contact pad.

8. The smart card device of claim 1, wherein the first substrate includes a PVC and/or PET layer.

9. The smart card device of claim 1, wherein at least the first substrate or the second substrate includes at least one edge portion which is at least partially transparent.

10. The smart card device of claim 1, wherein the flip chip is arranged offset relative to the contact pad.

11. The smart card device of claim 1, wherein the at least one LED module is arranged offset relative to the at least one first opening.

12. The smart card device of claim 1, wherein the front substrate includes a metallic layer.

13. The smart card device of claim 1,
wherein the at least one first opening includes a plurality of first openings which define a plurality of perforated designs,
wherein the at least one light guide includes a plurality of light guides arranged under the plurality of first openings,
wherein the at least one LED module includes a plurality of LED modules arranged proximate to the plurality of first openings,
wherein the at least one light guide includes a plurality of light guides which are arranged under the plurality of first openings and configured to direct the illumination produced by the plurality of LED modules through the plurality of first openings to illuminate the plurality of perforated designs.

14. The smart card device of claim 1, wherein a shape of the contact pad is an irregular shape.

15. A method for fabricating a smart card device, the method comprising:
perforating a front substrate to form at least one first opening and at least one second opening;
performing thermoforming on a first substrate to form a thermoformed projection on the first substrate;
forming a stacked arrangement using the front substrate, a first flexible sheet having a card circuitry formed thereon, the first substrate having at least one light guide, a second flexible sheet having an inductive circuitry formed thereon, and a second substrate, in a top-to-bottom order, wherein the card circuitry includes: a flip chip, a first antenna coil conductively coupled to the flip chip, the contact pad, and at least one conductor path conductively coupling the contact pad to the flip chip, wherein the inductive circuitry includes at least one LED module conductively coupled to a second antenna coil, wherein forming the stacked arrangement includes: aligning the at least one first opening and the at least one light guide; aligning the at least one second opening, the contact pad, and the thermoformed projection; and arranging at least one reflector at a position which is between the second flexible sheet and the second substrate, and under the at least one first opening; and
laminating the stacked arrangement to produce a laminated core.

16. The method of claim 15, wherein prior to forming the stacked arrangement, the method further comprising either one of the following:
perforating the first substrate to form a third opening, and arranging in the third opening the at least one light guide, which includes another stacked arrangement comprising a plurality of PET and/or PVC layers wherein a surface of at least one of the plurality of PET and/or PVC layers is roughened; and
roughening an integral surface portion of the first substrate thereby providing the at least one light guide.

17. The method of claim 15,
wherein the at least one first opening includes a plurality of first openings which define a plurality of perforated designs,
wherein the at least one light guide includes a plurality of light guides arranged under the plurality of first openings,
wherein the at least one LED module includes a plurality of LED modules arranged proximate to the plurality of first openings,
wherein the at least one light guide includes a plurality of light guides which are arranged under the plurality of first openings and configured to direct the illumination produced by the plurality of LED modules through the plurality of first openings to illuminate the plurality of perforated designs,
wherein the at least one reflector includes a plurality of reflectors which are arranged between the second flexible sheet and the second substrate, and under the plurality of LED modules, wherein the plurality of reflectors are configured to direct the illumination to the plurality of light guides.

18. The method of claim 15, wherein prior to forming the stacked arrangement, the method further comprising:
perforating the first substrate to form at least one third opening; and
applying, on the first substrate, a light diffusing ink on a surface portion adjacent to the at least one third opening, and
wherein the forming the stacked arrangement includes: receiving the at least one LED module within the at least one third opening.

19. The method of claim 15, wherein the card circuitry includes an additional LED module which is conductively coupled to the first antenna coil.

20. The method of claim 15, wherein the second flexible sheet includes a label formed thereon, the method further comprising:
perforating the second substrate to form at least one fourth opening;
wherein arranging the stacked arrangement includes: aligning the label with the at least one fourth opening.

21. The method of claim 15, wherein prior to performing thermoforming on the first substrate to form the thermoformed projection on the first substrate, the method further comprising:
overlaying a PVC layer on a PET layer to provide the first substrate.

22. The method of claim 15, wherein at least the first substrate or the second substrate includes at least one edge portion which is at least partially transparent.

23. The method of claim 15, wherein the flip chip is arranged offset relative to the contact pad.

24. The method of claim 15, wherein the at least one LED module is arranged offset relative to the at least one first opening.

25. The method of claim 15, wherein the front substrate includes a metallic layer.

26. The method of claim 15,
wherein the at least one first opening includes a plurality of first openings which define a plurality of perforated designs,
wherein the at least one light guide includes a plurality of light guides arranged under the plurality of first openings,
wherein the at least one LED module includes a plurality of LED modules arranged proximate to the plurality of first openings,
wherein the at least one light guide includes a plurality of light guides which are arranged under the plurality of first openings and configured to direct the illumination produced by the plurality of LED modules through the plurality of first openings to illuminate the plurality of perforated designs.

27. The method of claim 15, further comprising: dicing the laminated core to provide a plurality of smart card devices.

28. The method of claim 15, wherein a shape of the contact pad is an irregular shape.